(12) United States Patent
Gallagher et al.

(10) Patent No.: US 6,280,666 B1
(45) Date of Patent: *Aug. 28, 2001

(54) MOLDING METHOD FOR MAKING PLASTIC FOAM-BACKED SHELLS

(75) Inventors: Michael J. Gallagher, Hampton; Bruce A. Batchelder, Lee, both of NH (US)

(73) Assignee: Textron Automotive Company, Dover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/292,025

(22) Filed: Apr. 16, 1999

Related U.S. Application Data

(63) Continuation of application No. 08/883,582, filed on Jun. 26, 1997, now Pat. No. 5,922,256.

(51) Int. Cl.$^7$ .............................. B29C 39/12; B29C 44/06
(52) U.S. Cl. .................... 264/45.5; 264/46.4; 264/245; 264/302; 264/309
(58) Field of Search ...................... 264/45.5, 46.4, 264/245, 302, 309

(56) References Cited

U.S. PATENT DOCUMENTS

| | | |
|---|---|---|
| 4,562,025 | 12/1985 | Gray . |
| 5,238,622 | 8/1993 | Grimmer . |
| 5,580,501 | * 12/1996 | Gallagher et al. ............ 264/45.3 |
| 5,620,636 | * 4/1997 | Kawai et al. ................. 264/45.4 |
| 5,922,256 | * 7/1999 | Gallagher et al. ............ 264/45.5 |

FOREIGN PATENT DOCUMENTS

| | | | |
|---|---|---|---|
| 53-16081 | * 2/1978 | (JP) | ............ 264/45.5 |
| 53-125464 | * 11/1978 | (JP) | ............ 264/45.5 |
| 54-34792 | * 10/1979 | (JP) | ............ 264/45.5 |

* cited by examiner

Primary Examiner—Allan R. Kuhns
(74) Attorney, Agent, or Firm—Reising, Ethington, Barnes, Kisselle, Learman & McCulloch, PC

(57) ABSTRACT

A method of molding a plastic shell having an outer pliable skin layer and a foam backing layer comprises casting a first skin layer portion from wear resistant material in a first casting sequence for those areas of the panel susceptible to high wear and in a second casting sequence casting self-skinning foamable material against the remaining portion of the mold surface and over the first-cast skin layer portion to develop, simultaneously, the remaining outer skin layer portion of the shell and a foam backing layer which extends across the entire skin layer.

12 Claims, 1 Drawing Sheet

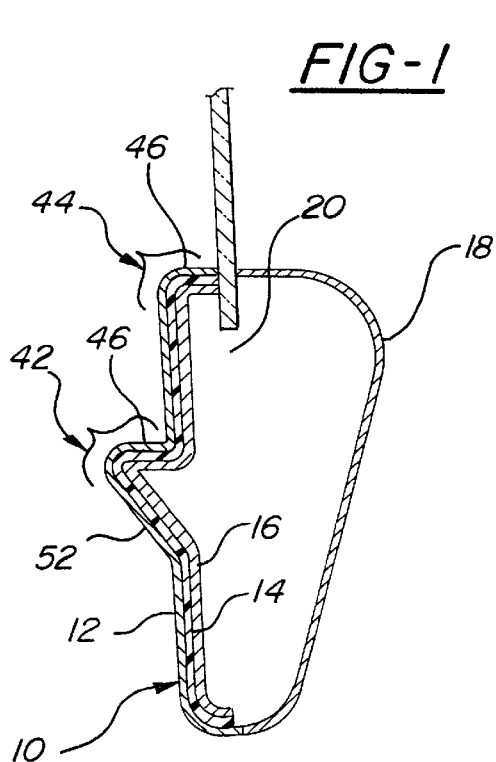
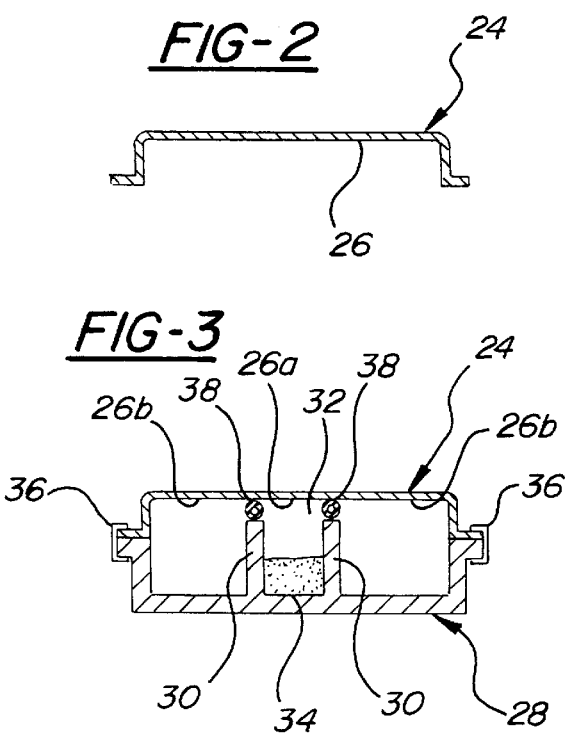
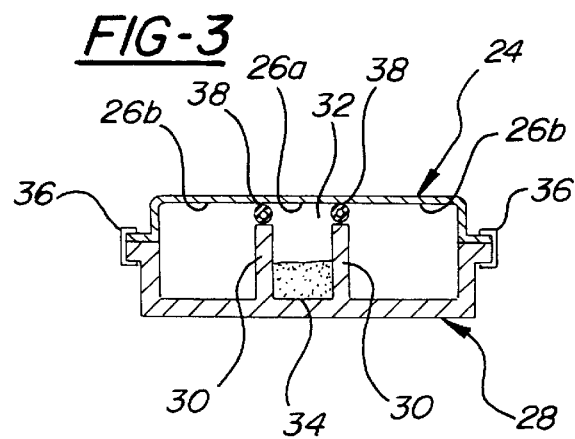
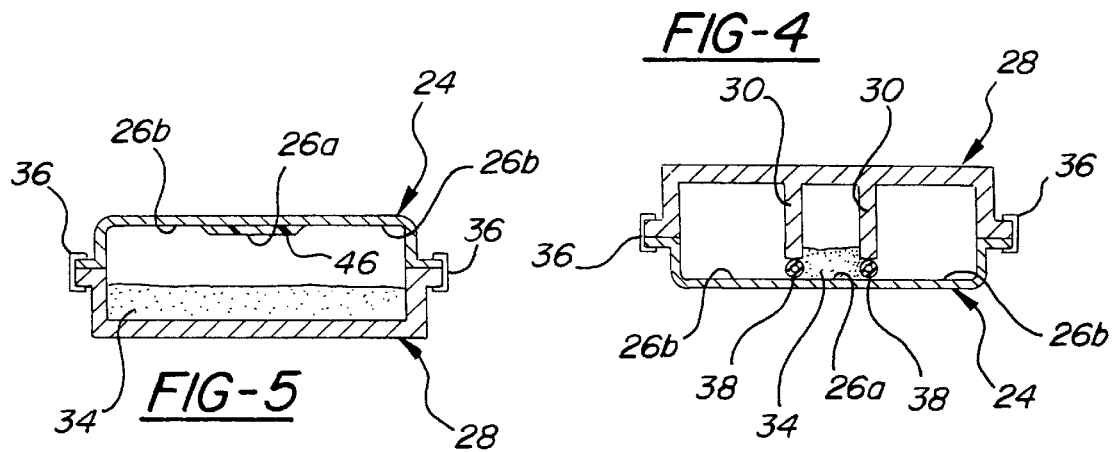
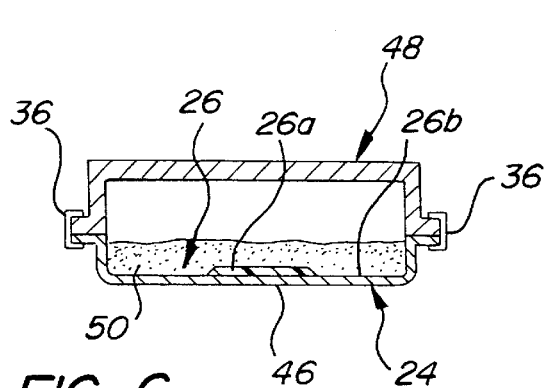
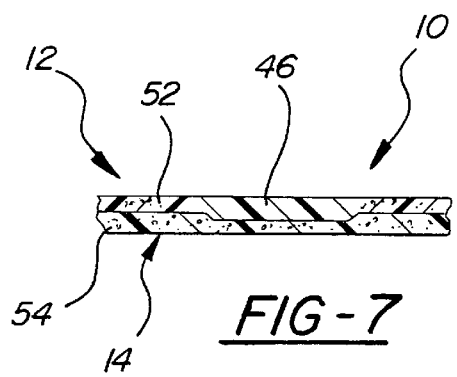

MOLDING METHOD FOR MAKING PLASTIC FOAM-BACKED SHELLS

This is a continuation of application Ser. No. 08/883,582, now U.S. Pat. No. 5,922,256, filed on Jun. 26, 1997 which is incorporated herein by reference.

This invention relates to a method for molding a single-piece plastic shell having a pliable outer skin layer backed by a soft foam layer.

BACKGROUND OF THE INVENTION

U.S. Patent No. 5,238,622 discloses a method for molding a plastic shell from a self-skinning foamable thermoplastics material which, when cast against a heated mold surface, produces a non-porous outer skin layer backed by a thin layer of soft foam material. The concurrent development of the skin and foam backing layers simplifies the manufacturing of the shell by combining what otherwise would be separate steps in the formation of the skin layer and foam backing layer. It has been found that when the skin layer portion of the shell is made very thin (i.e., on the order of 0.001 inches to 0.010 inches) and somewhat porous, that the panel exhibits a desirable tactile gripping quality that is very pleasing to the touch making it desirable for use in automotive interior applications such as door panels, arm rests, and the like. However, it has further been found that such a thin and porous skin layer is far less durable and wear resistent than conventional dense and non-porous skins frequently used in such applications, such as the materials disclosed in U.S. Pat. No. 4,562,025.

A foam-backed plastic shell formed in accordance with the present invention overcomes the foregoing objections.

SUMMARY OF THE INVENTION

A method of molding a plastic shell having an outer pliable skin layer and a foam backing layer includes providing a charge of wear resistant material and a separate charge of self-skinning foamable material. In a first casting sequence, the wear resistant material is cast against only a portion of a heated mold surface of a casting mold to form a first-cast portion of the shell's outer skin layer. In a subsequent casting sequence, the self-skinning foamable material is cast against the remaining portion of the mold surface still exposed after the first casting sequence and over the first-cast portion of the outer skin layer to generate simultaneously a remaining portion of the outer skin layer that is united to the first-cast portion thereof and an integral foam backing layer that extends across the entire skin layer of the shell.

A primary advantage of the present invention is that the majority of the shell can be made from the self-skinning foamable material having an outer skin layer that exhibits the tactile gripping quality desirable in automotive interior trim applications discussed above. In those regions of the shell susceptible to high wear, such as the tops of arm rests and other areas contacted frequently by the user or objects supported by the shell, such as cup holders, trays, and the like, a relatively greater wear resistent (preferably non-foaming for the greatest wear resistance) material can be employed to provide the skin layer in such high wear regions of the shell.

The present method retains the advantages provided by the self-skinning foamable material in eliminating the need to first form an outer skin layer and then a separate foam backing layer in separate operations, while overcoming the wearability disadvantages of a thin skin layer of such self-skinning foamable material by incorporation of a relatively more durable skin layer portion of wear resistant material in regions of the panels susceptible to high wear.

According to yet another advantage of the invention, the wear resistant material can be colored differently than the self-skinning foamable material to generate a one-piece multi-color skin layer on the shell.

These and other advantages and features of the invention will become more readily apparent and appreciated by those skilled in the art from the following detailed description and accompanying drawings wherein:

FIG. 1 is a diagrammatic view of a single-piece multi-material shell prepared in accordance with the present invention shown with associated component parts of an automotive vehicle door panel;

FIG. 2 is a diagrammatically shown cross-sectional view of a mold component for use in practicing the present invention;

FIG. 3 is a diagrammatically shown sectional view of a partitioned charge box coupled to the mold of FIG. 2 in a pre-release position;

FIG. 4 is a cross-sectional view like FIG. 3 but with the mold tool inverted to a powder-release position to carry out a first casting sequence of the present molding operation;

FIG. 5 is a diagrammatic cross-sectional view like FIG. 3 but showing a second unpartitioned charge box coupled to the mold following the casting of a first skin layer portion on the mold;

FIG. 6 is a view like FIG. 5 but with the mold tool inverted to a powder-release position; and FIG. 7 is a fragmentary, enlarged sectional view of a multi-material shell prepared by the process of the present invention.

DETAILED DESCRIPTION

The process, apparatus, and article of the present invention will be described with reference to the production of plastic single-piece thin walled shells for a typical automotive interior trim part, such as an interior door panel, consoles, arm rests, and instrument panels.

FIG. 1 shows a typical automobile door panel application of a single-piece, multi-material interior plastic shell 10 prepared in accordance with the present invention. The shell 10 includes an outer pliable skin layer 12 of plastics material backed by an integrated plastic foam layer 14. The plastics materials for either layer may be thermoplastic or thermoset in nature. An interior reinforcing insert 16 is joined to an exterior door panel 18 to provide an interior space 20 therebetween to accommodate the raising and lowering of a window 22.

FIGS. 2–6 illustrate powder molding apparatus and process for preparing the shell 10 according to the present invention. However, the apparatus could also accommodate use of the invention with either a liquid or pellet material media. FIG. 2 illustrates a powder casting mold 24 having a heated. mold surface 26. A first charge box 28 has an interior partition wall or divider panel 30 enclosing a, containment area 32 of the box 28 in which a charge of wear resistant plastic material 34 is introduced and the charge box 28 coupled by clamps 36 to the open-ended mold 24, with the mold 24 initially arranged above the charge box 28 in a pre-release position illustrated in FIG. 3. The free ends of the divider wall 30 are sealed by inflatable gaskets 38 against the mold surface 26 to isolate a predetermined portion 26a of the mold surface 26 above the containment area 32 from the remaining portion 26b.

The closed system of FIG. 3 is then inverted to a mold-down position illustrated in FIG. 4 causing the charge of wear resistant material 34 within the containment area 32 to be cast against the partitioned area 26a of the mold surface. In the preferred embodiment, the partitioned area 26a of the mold surface represents a region of the shell that in use is susceptible to high wear, such as the upper arm rest 42 and ledge regions 44 and the door panel of FIG. 1. In other applications, such high wear regions may include areas such as cup holders, shelf trays, and other areas designed to hold or come into frequent or prolonged contact with containers or other objects.

Examples of suitable materials for the wear resistant materials 34 include thermoplastic powders such as plasticized polyvinyl chlorides and related vinyl resins supplied in dry powder form for ease of gravity flow out of and into the charge box 28 of the types presently used by the industry in a manufacture of plastic shells for door panels, arm rests, instrument panels, consoles, and the like prepared by conventional PVC powder molding processes. U.S. Pat. No. 4,562,025 discloses such suitable thermoplastic powders that may be used for the wear resistant material 34 in carrying out the present invention, the disclosure of which is incorporated herein by reference. Other plastic material groups may include urethanes, olefins, olefin elastomers, polyesters, styrenics, and rubbers.

As the wear resistant material 34 is cast against the mold surface portion 26a, the heat from the mold melts the material adjacent the mold surface to form a cast layer 46 of the wear resistant material. The dwell time and mold temperature can be adjusted to control the thickness of the layer 46. The mold 24 is then cooled to cure the layer 46 of the wear resistant material which adheres to the mold surface 26a. The mold 24 along with the charge box 28 is inverted to the mold-up position dumping any excess unfused material 34 back into the charge box 28, and the box 28 is unclamped from the mold 24.

A second charge box 48 is then attached to the mold 24 to define a closed system in which the entire mold surface 26 is exposed to the interior of the second charge box 48, including the first skin layer portion 46, as illustrated in FIG. 5. Prior to attaching the second charge box 48, a charge of self-skinning foamable material 50 is introduced into the charge box 48. The mold 24 and box 48 are then inverted to the mold-down position illustrated in FIG. 6 causing the self-skinning foamable material. 50 to be cast against the remaining exposed portion 26b of the mold surface not previously covered by the first. layer 46 of material as well as across the exposed back side of the pre-cast first layer 46.

Suitable plastics that can be used to make up the charge of self-skinning foamable materials 50 are disclosed in U.S. Pat. No. 5,238,622, commonly owned by the assignee of the present invention and its, disclosure incorporated herein by reference. The preferred blend ratio is 75% by weight of a dry powder polyvinyl chloride foam compound having a relatively high molecular weight blended with a foaming agent, as identified in the '622 patent and 25% by weight of a second relatively lower molecular weight polyvinyl chloride thermoplastic dry powder compound prepared according to the teachings of the '622 patent. The high and low molecular weight portions are blended together in the prescribed ratio and, when cast against the mold surface portion 26b and across the first skin layer portion 46, the lower molecular weight material, having a lower melting point, are caused to melt and form a thin and somewhat porous skin portion 52 across the exposed mold surface area 26b forming an integral joint with the precast first layer portion 46, such that the portions 46 and 52 together define the unitary outer skin layer 12 of the shell. The remaining lower melting point material interact with those of the 75% portion to form, simultaneously with the development of the skin layer portion 52, an integral closed cell foam backing layer 54 extending across the entire skin layer 12 of the shell 10, including the first and second skin layer portions 46, 52 of the panel, as illustrated in FIG. 7.

As mentioned, the skin layer portion 52 is preferably thin and somewhat porous, which provides the material with a desirable tactile gripping feel which is pleasing to the touch. The thickness of the skin layer portion 52 is preferably in the range of 0.001 inches to 0.10 inches which attributes to the porous nature of the portion 52 and gives it its characteristic soft, gripping feel.

During casting of the portion 52, the low molecular weight material melt pools around the higher molecular weight material and flow against the heated mold surface portion 26b. The higher molecular weight material reacts with the foaming agent to form the closed cell foam backing layer 54. The mold is cooled to room temperature and the resultant shell 10 removed from the mold 24.

Although the thin and relatively porous outer skin layer portion 52 produces the desirable gripping sensation to the touch, its thinness and porosity detracts from the wearability of the material, thus the reason for providing the first skin layer portion 46 of the wear resistant material for high wear sections 42 and 44. The layer portion 46, by its nature, exhibits relatively greater wear resistance characteristics and can be developed to a greater thickness than that of the surrounding skin layer portion 52, as illustrated in FIG. 7, further adding to its wearability and suitability for sections 42 and 44.

Alternatively, the wear resistant skin layer 46 may be formed by methods other than casting. The layer 46 may be sprayed onto the mold surface 26a of mold 24. The spray may comprise plastic material, such as powder or liquid, appropriately engineered to be sprayed by known spray guns. The mold surface 26a may be preheated or heated after the plastic is sprayed onto the mold surface 26a to form the layer 46 and then cooled to cure layer 46. For example, preheating of the mold to temperatures typical for casting would not be required for the spray application of a thermoset. urethane. The thermosetting reaction of the urethane could be accommodated through various chemistry changes as is well known in the art as a means to promote proper cure of the material without having to rely or, typical casting temperatures for adequate cure. The remaining self-skinning foaming material may be applied. as described above and as shown in FIGS. 5 and 6.

If desired, the wear resistant material that produces the first skin layer portion 46 can be colored differently than the self-skinning, foamable material used to generate the remaining skin layer portion 52 such that a single-piece multi-color skin layer 12 results. On the other hand, the charge materials 34 and 50 can be selected to have the same color such that the relatively more durable first skin layer portion 46 is visibly imperceptible from the surrounding remaining skin layer portion 52 in the final product.

While the invention is described with reference to the manufacture of a shell having a self-skinned outer skin layer portion which is relatively thin and porous so as to exhibit a desirable gripping quality, it is suitable for use in the formation of other shells of the same general type but whose outer skin layer portion is developed to be relatively thicker and non-porous, but yet combined with an outer skin layer portion of wear resistant material exhibiting relatively greater wear resistance than the surrounding self-skinning outer layer material provided in those areas of the panel susceptible to high wear.

The disclosed embodiments are representative of a presently preferred forms of the invention, but: are intended to be illustrative rather than definitive thereof. The invention is defined in the claims.

We claim:

1. A method of molding a plastic shell having a pliable outer skin and a backing layer, the method comprising the steps of:

providing a charge of a first plastic material configured to form a wear resistant first skin layer portion of the outer skin;

providing a charge of a second plastic material configured to form a second skin layer portion of the outer skin that is relatively less wear resistant than the wear resistant skin layer portion;

providing a casting mold having a heated mold surface;

forming the wear-resistant first skin layer portion by depositing the first plastic material against a predetermined portion of the mold surface, the wear-resistant first skin layer portion including a backside surface spaced from the mold surface;

forming an integral backing layer behind the wear-resistant first skin layer portion while simultaneously forming the second skin layer portion on a remaining portion of the heated casting surface by casting the second material across the remainder of the heated casting surface and across the backside surface of the wear resistant first skin layer portion; and forming the wear-resistant skin layer portion by partitioning the predetermined portion of the mold surface from the remaining exposed portion during casting of the first plastic material to contain such material within the predetermined region of the mold surface.

2. The method of claim 1 wherein the step of providing a charge of a second plastic material includes providing a self-skinning foamable plastic material.

3. The method of claim 2 wherein the second plastic material is provided by mixing relatively low molecular weight material with relatively high molecular weight material and a foaming agent.

4. The method of claim 3 wherein the mold surface is heated sufficiently to melt the relatively low molecular weight material when the mixture is cast into the mold causing the melted relatively low molecular weight material to flow into interstices between the relatively high molecular weight material adjacent the mold surface to form the remaining portion of the outer skin layer and concurrently to heat the relatively high molecular weight material sufficiently to cause them to react with the foaming agent to produce the foam backing layer.

5. The method of claim 1 wherein the firs and second plastic materials are provided as different colored materials to generate a multi-colored shell.

6. The method of claim 1 wherein the step of providing a charge of a first plastic material includes providing a non-foaming plastic material.

7. The method of claim 1 wherein the step of forming an integral backing layer and a second skin layer portion of the plastic shell includes removing the partition following the casting of the first plastic material and casting the second material across the wear-resistant skin layer portion and the remaining exposed portion of the mold surface.

8. The method of claim 1 wherein the wear-resistant skin layer portion is formed by spraying the first plastic material onto the predetermined portion of the mold surface.

9. The method of claim 8 wherein the wear resistant material and the self-skinning foamable material are provided as different colored materials to generate a multi-colored shell.

10. The method of claim 1 wherein the step of providing a charge of a first plastic material includes providing a first plastic material selected from a group consisting of urethanes, olefins, olefin elastomers, polyester and styrenics.

11. The method of claim 1 wherein a vinyl compound is provided as the second plastic material.

12. A method of molding a plastic shell having a pliable outer skin and a backing layer, the method comprising the steps of:

providing a charge of a first plastic material configured to form a wear resistant first skin layer portion of the outer skin;

providing a charge of a second plastic material configured to form a second skin layer portion of the outer skin that is relatively less wear resistant than the wear resistant skin layer portion;

providing a casting mold having a heated mold surface;

forming the wear-resistant first skin layer portion by depositing the first plastic material against a predetermined portion of the mold surface, the wear-resistant first skin layer portion including a backside surface spaced from the mold surface;

forming an integral backing layer behind the wear-resistant first skin layer portion while simultaneously forming the second skin layer portion on a remaining portion of the heated casting surface by casting the second material across the remainder of the heated casting surface and across the backside surface of the wear resistant first skin layer portion; and wherein the first plastic material is polyvinyl chloride.

* * * * *